United States Patent

[11] 3,586,012

| | | |
|---|---|---|
| [72] | Inventor | Edward A. Paule<br>Fort Worth, Tex. |
| [21] | Appl. No. | 806,510 |
| [22] | Filed | Mar. 12, 1969 |
| [45] | Patented | June 22, 1971 |
| [73] | Assignee | Alcon Laboratories, Inc.<br>Fort Worth, Tex. |

[54] MANUAL CONTACT LENS CLEANING DEVICE
9 Claims, 9 Drawing Figs.

[52] U.S. Cl. .................................... 134/93,
134/155, 206/5
[51] Int. Cl. ....................................... B08b 3/04,
B08b 11/02
[50] Field of Search............................ 134/93,
137, 155; 206/.5, 5; 239/313, 316

[56] References Cited
UNITED STATES PATENTS

| 404,354 | 5/1889 | Huber | 206/.5 UX |
|---|---|---|---|
| 3,009,468 | 11/1961 | Eberle | 134/93 |
| 3,052,246 | 9/1962 | Beard | 206/5 (A) X |
| 3,101,087 | 8/1963 | Watson | 206/5 (A) X |
| 3,115,146 | 12/1963 | Erwin | 134/137 |
| 3,168,100 | 2/1965 | Rich | 134/137 |
| 3,367,481 | 2/1968 | Tanaka | 206/5 (A) |
| 3,375,834 | 4/1968 | Best et al. | 134/155 X |

*Primary Examiner*—Daniel Blum
*Attorney*—Anderson, Luedeka, Fitch, Even and Tabin ABSTRACT: A contact lens cleaning unit including means defining a fluid passageway, a support means for a dissolvable lens treating composition in the fluid passageway and a lens receiving basket in the path of fluid containing the dissolved treating composition. The cleaning unit is adapted for holding under a running water tap to provide for cleaning of contact lenses.

PATENTED JUN22 1971 3,586,012

INVENTOR
EDWARD A. PAULE

ATTYS.

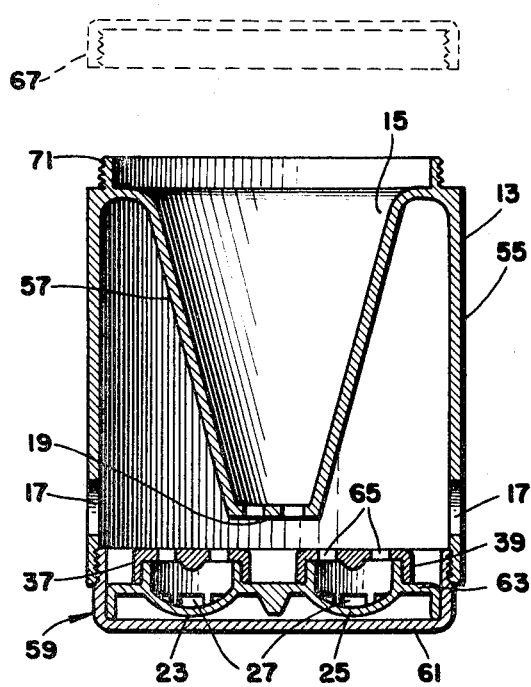

MANUAL CONTACT LENS CLEANING DEVICE

This invention relates generally to a contact lens cleaning unit, and more particularly it relates to a convenient, compact contact lens cleaning unit which permits efficient and positive cleaning and rinsing of contact lenses, and also provides a storage and soaking kit for the contact lenses.

There are several forms of commercially available contact lens cleaning and storage units. Such devices, which are generally referred to as lens containers or soaking kits, have been principally constructed to provide for positive isolation of the lenses from each other during cleaning and storage to prevent a possible mixup of the lenses by the wearer. Known lens containers are usually of a convenient size to be easily carried in the purse or pocket of the wearer, and generally include a fluidtight tubular or dish-shaped container and separate lens holders within the container for receiving and retaining each of the contact lenses. Access to the container by means of a container cover or lids on the individual lens holders permit insertion of the contact lenses into the container.

In accordance with known practices, contact lenses are cleaned by placing a few drops of cleaning solution, i.e., a soap or detergent solution, on the lens and rubbing the lens between the fingers. After cleaning, the lenses are placed into the container and soaking solution, i.e., a germicidal solution is added to the container and the unit is sealed. Generally, the contact lenses are cleaned with the cleaning solution by adding the cleaning solution to the container, sealing the container and shaking the container. The container is then opened and the cleaning solution is poured out. The lenses are then rinsed with water, for example by filling the container with water, sealing the container again, and shaking the container. The container is again opened, and the water is poured out. The container is then filled with the germicidal soaking solution and the cap is placed on the container for storage of the contact lenses in the soaking solution.

The process of cleaning and storing contact lenses in such devices requires the user to open and close the container several times in order to place the various solutions in the container and achieve an intimate washing and cleaning of the lenses. This operation can sometimes be quite time consuming and may result in splashing or spilling of the various solutions. The operation also requires that the user have available separate sources of the cleaning and soak solutions, generally sold in the form of aqueous solutions of relatively large volume, and as such are inconvenient to carry with the user. Accordingly, it would be desirable to provide a contact lens cleaning unit which does not require several openings and closings of the unit to carry out a complete cleaning and soaking operation, and which does not require the user to have available aqueous cleaning and soaking solutions. Further, it would be desirable to provide a contact lens cleaning unit which could be easily demonstrated to a new contact lens wearer by a physician, which is simple to use, and which does not require complicated instructions.

It is a principal object of the present invention to provide a convenient, compact, easy to use contact lens cleaning unit. A further object is to provide a compact contact lens cleaning unit which provides for one step cleaning and rinsing of the contact lenses. Another object is to provide a contact lens cleaning unit which insures that the cleaning fluid will intimately bathe the entire surfaces of the contact lenses. An additional object is to provide a contact lens cleaning unit which is readily and conveniently converted to a compact storage kit for the contact lens.

These and other objects of the invention will become apparent from the following detailed description and from the drawings of which:

FIG. 5 is an elevational sectional view of another embodiment of the contact lens cleaning unit;

FIG. 6 is an elevational view of a contact lens storage container incorporating the basket assembly of FIG. 5;

FIG. 7 is an elevational, partial sectional view of another embodiment of the contact lens cleaning unit;

FIG. 8 is an elevational, partial sectional view taken along line 8–8 of FIG. 7 illustrating a contact lens storage container incorporating the cleaning unit of FIG. 7; and FIG. 9 is an elevational view, with parts broken away of another embodiment of the contact lens cleaning unit.

Figure 1:
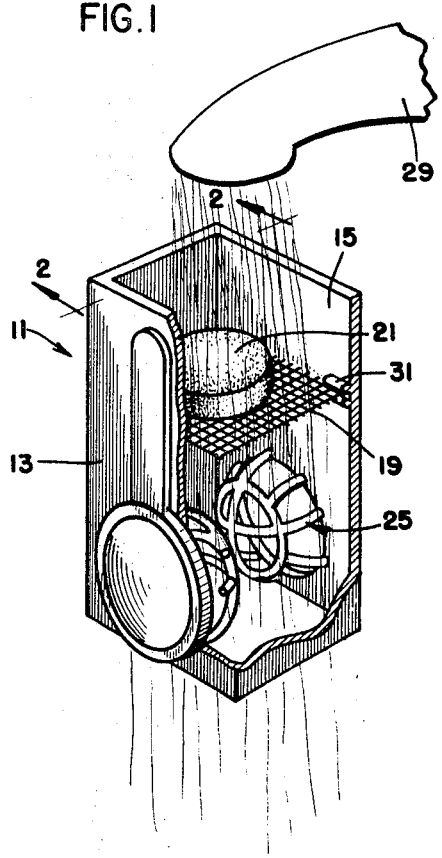
FIG. 1 is a perspective cutaway view of one embodiment of the contact lens cleaning unit illustrating the use of the unit in the cleaning of contact lenses.
Figure 2:
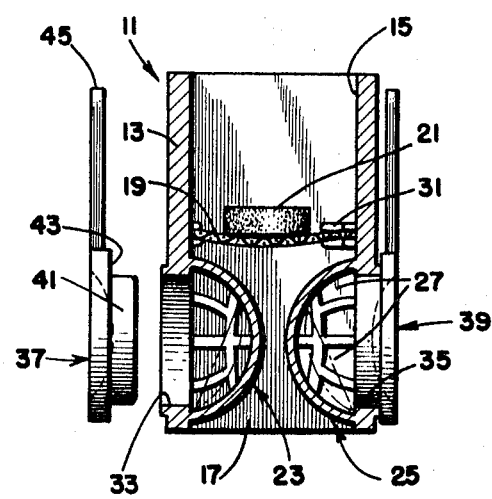
FIG. 2 is a partial elevational sectional view of the cleaning unit of FIG. 1 taken along line 2–2 of FIG. 1.

Very generally, and having reference to FIGS. 1 and 2 of the accompanying drawings, there is illustrated a contact lens cleaning unit 11. The cleaning unit 11 includes a hollow body member 13, which defines a fluid passageway and which has an inlet opening 15 for the ingress of fluid into the passageway defined by body member 13 and an outlet opening 17 spaced from the inlet opening 15 for the egress of fluid from the passageway. Means 19 are provided within the fluid passageway for supporting and retaining a quantity of a dissolvable lens treating composition 21 in the path of the fluid which flows through the passageway from the inlet opening 15 to the outlet opening 17. Lens holder baskets 23 and 25 are supported by the body member 13 in the path of the fluid containing the dissolved treating composition. The lens receiving baskets 23, 25 are provided with suitable openings 27 to permit the fluid containing dissolved treating composition to flow through the baskets and bathe the surfaces of the contact lenses disposed within the baskets.

Referring to FIGS. 1 and 2 there is illustrated a specific embodiment of a contact lens cleaning unit as described herein. In the embodiment of FIGS. 1 and 2, the hollow body member 13 is in the form of a tube having a rectangular cross section. The tube may have a cylindrical or other shaped cross section, as may be desired. The tubular body member is open ended, and with the arrangement of the cleaning unit 11 in relation to a water tap 29 as illustrated in FIG. 1, the inlet opening 15 is defined by the open upper end of the body member 13 and the outlet opening 17 is defined by the open lower end of the body member 13.

In the embodiment illustrated in FIGS. 1 and 2 the means 19 for supporting and retaining the dissolvable treating composition in the fluid passageway defined by the body member 13 is in the form of a foraminous screen disposed substantially transversely across the tube. The screen may be supported by suitable brackets 31, or other form of retaining means, which may be integrally formed with the body member 13. As seen in FIG. 2, the screen preferably is dish-shaped in order to locate the treating composition centrally within the fluid passageway so as to provide for maximum contact of the treating composition by the fluid flowing through the passageway.

Alternately, the supporting means 19 may be in the form of a slotted plate, a series of bars or prongs extending radially inwardly from the sidewalls of the body member 13, or in any other form which will cause the treating composition to be supported and retained in the fluid passageway upstream of the lens holder baskets.

In the embodiment illustrated in FIGS. 1 and 2 the treating composition 21 is in the form of a water soluble tablet, and this is generally preferred. However, it is also contemplated to utilize a treating composition in the form of discrete particles or granules of a size sufficient to be retained upon the support means 19, and also to utilize a treating composition in the form of a viscous fluid or gel, as may be desired with particular needs and constructions of the cleaning unit. The particular form of the treating composition 21 does not form a part of the subject matter of the disclosed invention, but for best results, the treating composition is provided in a compact, concentrated form which is readily retained upon the support means 19 within the fluid passageway so that flow of fluid through the cleaning unit will incrementally dissolve the treating composition and carry the dissolved treating composition through the cleaning unit and into contact with the contact lenses in the lens holder baskets 23, 25.

It has been found to be generally desirable to provide the support means 19 for the treating media at a distance spaced from the inlet opening 15. This positions the treating composition generally interiorly of the fluid passageway defined by the body member 13, and prevents splashing of fluid containing dissolved treating composition out of the cleaning unit during use of the unit. In this connection, when the body member has a tubular configuration such as illustrated in FIGS. 1 and 7, it has been found desirable to locate the support means 19 approximately one-half inch or more from the inlet opening 15.

In the embodiment of FIGS. 1 and 2 the lens holder baskets 23, 25 are hemispherically shaped and extend inwardly from opposite sidewalls of the body member 13 into the fluid passageway downstream from the support means 19. Access ports 33, 35 are provided in the sidewall of the body member 13 in alignment with the baskets 23, 25 to permit insertion and removal of the contact lenses.

The baskets 23, 25 are constructed from a lattice framework in order to provide openings 27 which permits fluid flowing through the body member 13 to flow through the baskets. In the embodiment illustrated in FIGS. 1 and 2, the lens holder baskets 23, 25 are formed integrally with the body member. Alternately, the baskets may be formed separately from the body member and removably mounted in suitable openings in the sidewall of the body member 13.

Figure 4:
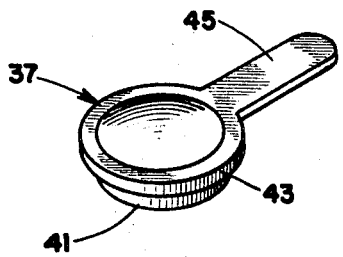
FIG. 4 is a perspective view of the lens holder basket cap of the cleaning unit of FIG. 1.

Cap or lid members 37, 39 are provided for sealing the access ports 33, 35. In the illustrated embodiment of FIGS. 2 and 4, the cap is in the form of a flanged stopper which includes a body 41 which interfits with and is frictionally engaged in the access port, and an annular stop flange 43 which engages the sidewall of the body member 13 to prevent the cap from being pushed through the access port into the lens holder basket. A suitable tab 45 for grasping with the fingers is provided to aid in removal of the cap.

Alternately, the caps 37, 39 for the lens holder baskets may be provided with screw threads, or other form of attachment means, which cooperate with suitable threads or attachment means on the body member 13 to retain the cap in sealing engagement with the access port. Preferably, as illustrated in FIG. 2, the caps are formed so that when the stop flange is in engagement with the sidewall of the body member the cap body is approximately coplanar with the interior sidewall of the body member. This aids in retaining the lenses in the main stream of fluid flowing through the fluid passageway and insures that both surfaces of the lens will be thoroughly bathed by the fluid.

When the cleaning unit is utilized for the cleaning of contact lenses, the lenses are placed in respective lens holder baskets, which may be suitably identified as left and right, and the caps are placed on the access ports to seal the baskets. A suitable cleaning composition, which may be in the form of a tablet, is placed on the support screen and the unit is held under a running water tap. The water flows through the fluid passageway and dissolves the cleaning composition. The stream of water containing dissolved cleaning composition then flows through the lens holder baskets and bathes and cleans the lens disposed therein. The cleaning unit is held under the water tap until the cleaning composition is completely dissolved. Further flow of water through the unit after the cleaning composition is completely dissolved automatically rinses the lenses without requiring opening and closing of the cleaning unit.

Figure 3:
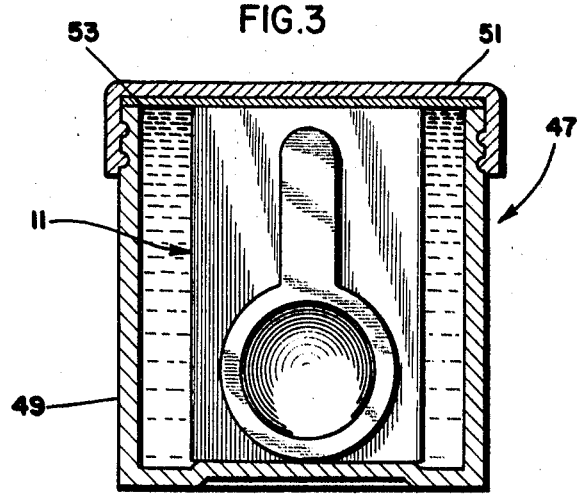
FIG. 3 is a partial elevational sectional view of a contact lens storage container incorporating the cleaning unit of FIG. 1.

FIG. 3 illustrates in partial elevation and section a carrying case and soaking kit 47 which incorporates the cleaning unit 11 illustrated in FIGS. 1 and 2. The carrying case 47 includes a hollow open mouth jar or container 49 of a size sufficient to receive the cleaning unit 11. A lid or cover 51 is provided for the jar 49 and cooperating attachment means, such as screw threads are provided in the lid 51 and the jar 49 to provide for attachment of the cover to the container. Preferably, and as illustrated in FIG. 3, the lid 51 is provided with resilient sealing means 53 which engages the sidewall of the jar 49 when the lid is placed on the jar to provide a fluidtight seal.

As illustrated in FIG. 3, the jar 49 desirably has a volume slightly larger than the cleaning unit 11. In addition, the depth of the jar, as measured from the interior bottom wall of the jar upon which the cleaning unit rests, is desirably the same or slightly less than the height of the cleaning unit so that when the cleaning unit 11 is placed within the jar 49 and the lid 51 is screwed thereon so that the sealing means 53 engages the sidewall of the jar, the sealing means 53 will also engage the exposed upper end of the cleaning unit and will bias the cleaning unit against the bottom wall of the jar 49 thereby preventing lateral displacement of the cleaning unit within the jar when the jar and cleaning unit combination is employed as a carrying case and soaking kit, which possibly could result in damage to the contact lenses or accidental removal of the basket lids.

The soaking solution may be in the form of an aqueous solution which is used to fill the jar 49 after the cleaning unit containing the contact lenses within the baskets 23, 25 is placed in the jar. Alternately, and in accordance with a preferred usage, a dissolvable tablet composition is placed on the support means 19 of the cleaning unit, the cleaning unit is placed in the jar 49 and the jar is filled with water, which may be tap water or distilled water. The composition of the tablet is adjusted so that when the tablet dissolves in the volume of water which is contained in the jar, a soaking solution having a desired concentration of active ingredients will be obtained.

A further embodiment of a cleaning unit as described herein is illustrated in FIGS. 5 and 6. FIG. 5 is an elevational sectional view of a cleaning unit in which the hollow body member 13 is in the form of a generally cylindrical tube 55. A concentric funnel-shaped duct 57 extends inwardly of the cylindrical tube 55 from one end thereof. The wide mouth of the duct 57 forms the inlet opening 15, and the outlet opening 17 is in the form of ports or holes in the sidewall of the tube 55.

The narrow mouth of the duct 57 is provided with suitable transverse support means 19 which may be integrally formed with the duct 57, to provide support for the treating composition. Alternately, a screen or other form of support means may be disposed across the mouth of the duct, or may be disposed at some intermediate point in the duct, and the location of the support means within the duct is not important so long as the support means operates to support the treating composition in the fluid passageway upstream of the lens holder baskets 23, 25. It is also contemplated that the sidewall of the duct 57 can be employed as the support means 19, for example, when the lens treating composition is in the form of a tablet which has a diameter larger than the diameter of the narrow mouth of the duct 57.

In the embodiment of FIG. 5 the lens holder baskets 23, 25 are supported in a basket assembly 59. The basket assembly 59 includes an open mouth shallow cylindrical receptacle 61 which is removably secured to the end of the cylindrical tube 55 opposite the inlet opening 15. The lens holder baskets 23, 25 are supported by an annular spider 63 which is carried by the receptacle 61. In the illustrated embodiment of FIG. 5 the lens holder baskets 23, 25 and the spider 63 are in the form of an integral piece, but can be separately formed if so desired.

Suitable basket caps 37, 39 are provided for the lens holder baskets 23, 25. In the embodiment illustrated in FIG. 5, the caps 37, 39 are disposed within the fluid passageway defined by the body member 13. Accordingly, suitable passageways 65 are provided in the caps 37, 39, in addition to the openings 27 in the lens holder baskets 23, 25 for flow of fluid containing dissolved treating composition through the baskets and into contact with the contact lenses.

The basket assembly 59 may be disengaged from the cylindrical tube 55 and provided with a suitable lid or cover 67 to provide a soaking kit 69 as illustrated in FIG. 6. As seen in FIG. 5, the hollow body member may be provided with an upstanding annular flange 71 adjacent the inlet opening which may be suitably threaded to receive the lid 67 for storage purposes when the device is not in use.

It is apparent that the embodiment illustrated in FIG. 5 might be constructed with the dish-shaped container 61 integral with the hollow body member 13 and with the lens holder baskets 23, 25 formed in the bottom wall of the container 61 to provide a one piece cleaning unit. Suitable access ports could be provided in the bottom wall of the container 61, such as is illustrated in the embodiment of FIG. 2.

In operation of the cleaning unit illustrated in FIG. 5 the basket assembly 59 is disengaged from the hollow body member 13 and the lenses are placed in the lens holder baskets. The basket caps 37, 39 are placed on the baskets and the basket assembly is secured into the end of the body member 13. A suitable treating composition, such as described herein, is introduced and supported within the funnel-shaped duct 57, and the cleaning unit is placed under a running water tap. The water flows over and around the treating composition supported within the duct 57 dissolving the treating composition. The water and dissolved treating composition flows out of the end of the narrow mouth of the duct 57 and into the basket assembly 59, through the lens holder baskets 23, 25 in the openings provided in the baskets and in the basket caps 37, 39 and out of the cleaning unit through the outlet openings 17 in the sidewall of the hollow body 13.

After the cleaning and rinsing operation is completed, the basket assembly 59 may be disengaged from the body member 13 and the lenses removed for wearing. Alternatively, a soaking solution may be added to the container 61 and the lid 67 may be screwed on the container to provide a storage and soaking kit 69.

There is illustrated in FIGS. 7 and 8 a further embodiment of a contact lens cleaning unit as described herein. FIG. 7 is a partial sectional view of a cleaning unit 11 in which the hollow body member 13 is in the form of a generally cylindrical tube. One end of the hollow body member 13 forms the inlet opening 15, and the opposite end of the hollow body member forms the outlet opening 17. A support means 19, which in the illustrated embodiment of FIG. 7 is a screen disposed transversely across the hollow body member, is provided intermediate the inlet and outlet openings for supporting a lens-treating composition.

As further illustrated in FIGS. 7 and 8, the cleaning unit 11 includes a basket assembly 59, which is removably secured to the hollow body member 13. The basket assembly is in the form of a generally planar plate member 73, having a width substantially equal to the interior diameter of the hollow body member 13, and having a relatively narrow width. The lens holder baskets 23, 25 are carried by the plate 73, and in the embodiment illustrated in FIGS. 7 and 8, the lens holder baskets 23, 25 are integrally formed with the plate 73. Alternately, the lens holder baskets may be removable from the plate 73 if such is desired.

As best seen in FIG. 7 and in the preferred form of this embodiment of the cleaning unit 11, the lens holder baskets 23, 25 are disposed on opposite sides of the plate 73. It has been found that this construction is generally preferable in order to provide for maximum contact of the fluid flowing through the cleaning unit with the lenses, and uniform cleaning and rinsing of the lenses. Basket caps 37, 39, generally in the form as described in connection with the embodiment of FIG. 2, are provided for the lens holder baskets 23, 25. The caps 37, 39 may be provided with upstanding tabs 75, 77 in order to permit easy insertion and removal of the caps. As illustrated in FIG. 7, the tabs 75, 77 may be differently shaped in order to easily differentiate between the left and right lenses.

Since the entire basket assembly 59 is disposed within the fluid passageway defined by the hollow body member 13, it is desirable to provide for positive orientation of the caps 37, 39 in relation to the basket assembly in order that the tabs 75, 77 will not block the fluid passageway when the cleaning unit is placed under a water tap. Accordingly, the plate 73 and the caps 37, 39 may be provided with cooperating orienting means, such as the tab and slot illustrated at 79 in FIG. 8, in order to insure that when the caps are placed on the basket assembly, the tabs will be vertically aligned and will not block the fluid passageway.

Any suitable means may be provided for removably securing the basket assembly 59 in the hollow body member 13. One such means is illustrated in FIGS. 7 and 8, and includes a key 81 formed in one end of the plate 73 which cooperates with a split interior annular flange 83 formed in the interior wall of the hollow body member 13. The basket assembly 59 is inserted into the hollow body member 13 so that the key passes through the slot in the annular flange 83. The basket assembly is then turned until the key rides up the inclined surface 85 of the flange 83 and wedges the basket assembly 59 against the flange, thereby securing the basket assembly in the hollow body member.

It is apparent that many other forms of securing means may be provided for removably securing the basket assembly 59 in the hollow body member 13.

In operation, the cleaning unit illustrated in FIGS. 7 and 8 may be employed in the manner as discussed herein, and a treating composition tablet is placed on the support means 19 and the unit is placed under a running water tap.

After the cleaning and rinsing operation has been completed, the cleaning unit 11 of FIGS. 7 and 8 may be utilized as a storage container and soaking kit by securing covers 87, 89 to each end of the hollow body member, as illustrated in FIG. 8. The cover may be in the form of a screw threaded cap which cooperates with suitable threads on the hollow body member adjacent each end thereof. As discussed herein, it is desirable to provide suitable sealing means in each of the covers in order to provide a fluidtight container.

There is illustrated in FIG. 9 a still further embodiment of the cleaning unit 11 in which the hollow body member 13 has an hourglass configuration. One end of the hollow body member 13 forms the inlet opening 15, and ports in the sidewall of the hollow body member 13 adjacent its other end form the outlet opening 17. A support means 19, which in the illustrated embodiment of FIG. 9 is a screen, is disposed transversely of the hollow body member 13 adjacent the throat of the hourglass.

A basket assembly 59 is removably secured to one end of the hollow body member similar to that described herein in connection with FIG. 5. In the embodiment illustrated in FIG. 9, the basket assembly is a one-piece unit having a recessed bottom wall which is threadedly connected to the end of the hollow body member 13 opposite the inlet opening 15. The lens holder baskets 23, 25 are formed integrally with the container 61 and access ports are provided in the bottom wall of the container 61 for insertion and removal of the contact lenses. The lens holder baskets 23, 25 are inverted from that position illustrated in FIG. 5 so that the lens holder caps 37, 39 are accessible from the exterior of the cleaning unit.

A removable cover 91 is provided for the end of the hollow body member opposite the basket assembly 59 which defines the inlet opening 15. The cover 91 is desirably configured so that it may also be utilized as a cover for the basket assembly 59 to provide a compact storage and soaking kit, as described in connection with the embodiment of FIG. 6.

As is indicated herein, the contact lens cleaning unit is particularly suited for use with a concentrated lens treating composition which is dissolved in a stream of water flowing from a water tap to form a treating solution for contacting the lenses disposed within the cleaning unit. Several forms of tablet compositions which are suitable for use in cleaning contact lenses using the described contact lens cleaning unit can be prepared. One such composition, which is considered to be advantageous is a tablet having the following composition:

Spray dried lactose   300 mg.
Corn starch   20 mg.

Magnesium stearate 1.5 mg.
Detergent 35 mg.

Other compositions and ingredient formulations may also be utilized. A preferred detergent is a nonionic detergent, for example polyoxyethylene (12) tridecyl ether/urea complex, although other detergents such as sodium lauryl sulfate, may also be employed. It has been found to be most advantageous if the cleaning tablet is formulated so that it will dissolve under a running water tap in from about 30 to about 45 seconds.

A tablet composition suitable for placing within the cleaning unit when the cleaning unit is utilized as a storage and soaking unit is as follows:

A quaternary compound, typically
Benzethonium chloride 7 mg.
disodium edetate 7 mg.
lactose 40 mg.
Plasdone K29-32 1.2 mg.
(polyvinyl pyrrolidone)
sodium benzoate 20 mg.

The above composition has been formulated to provide a soaking tablet, which when dissolved in 35 cc. of water, forms a solution containing 0.02 percent benzethonium chloride and 0.02 percent disodium edetate. Other preservative components, such as Thimerosal, can be added. It is apparent that if the volume of the storage container or soaking kit is different, the relative concentration of the ingredients of the soaking tablet may be varied.

It will be seen from the foregoing that a compact, easy to use contact lens cleaning unit has been described which does not require frequent manipulation of the unit in order to obtain a desired cleaning and rinsing of the contact lenses. The cleaning unit utilizes a flowing stream of fresh tap water to dissolve a lens treating composition which flows into contact with the lenses. Although several embodiments of the contact lens cleaning unit are described, it is apparent that other embodiments, within the skill of the art might also be constructed.

Various of the features of the invention are set forth in the following claims:

1. A contact lens cleaning unit, comprising a hollow body member defining a fluid passageway having an inlet opening to permit ingress of fluid into the passageway and an outlet opening spaced from said inlet opening to permit egress of the fluid from the passageway, means located in the path of fluid flowing through the passageway between said inlet opening and said outlet opening for supporting a quantity of a lens-treating composition capable of being dissolved by the fluid, said support means being adapted to expose a quantity of the lens treating composition to the fluid flowing through the passageway and to maintain the lens treating composition in the path of flow of the fluid as the lens treating composition dissolves, and a pair of lens receiving baskets disposed in the path of fluid containing dissolved treating composition and spaced from said outlet, said baskets being provided with openings to permit the fluid containing dissolved treating composition to pass through said baskets into contact with the surfaces of the lenses respectively contained therein.

2. A contact lens cleaning unit in accordance with claim 1 wherein the hollow body member is tubular, and the lens receiving baskets are supported within the interior of the tubular body member intermediate the inlet opening and the outlet opening and downstream of the support means for the lens treating composition.

3. A contact lens cleaning unit in accordance with claim 1 wherein each of said baskets is hemispherical in shape and integral with the sidewall of the hollow body member, the sidewall of the hollow body member having apertures therein communicating with the interior of each of said baskets, and a closure for each of said apertures.

4. A contact lens cleaning unit in accordance with claim 1 which further comprises an open-mouthed container for receiving the hollow body member, a closure for said container, the container being of a size such that when the hollow body member is disposed therein and the closure is placed on the container, the closure biases the hollow body member against the container.

5. A contact lens cleaning unit in accordance with claim 1 wherein said lens receiving baskets are carried by a basket assembly, said basket assembly being removably secured to the hollow body member.

6. A contact lens cleaning unit in accordance with claim 5 wherein the hollow body member is tubular, and the basket assembly includes a plate member removably secured within the interior of the tubular body member, said lens receiving baskets being hemispherically shaped and being carried by said plate member disposed on opposite sides thereof, said plate member having apertures therein communicating with the interior of said baskets, and closures for said apertures.

7. A contact lens cleaning unit in accordance with claim 6 wherein closures are provided for the ends of the tubular body member.

8. A contact lens cleaning unit in accordance with claim 5 wherein the basket assembly includes an open-mouthed receptacle removably secured to the end of the hollow body member opposite the inlet opening, the lens receiving baskets being supported within the receptacle.

9. A contact lens cleaning unit in accordance with claim 8 including a closure for said receptacle.